V. MULHOLLAND.
APPARATUS FOR HANDLING GLASSWARE.
APPLICATION FILED JULY 22, 1908.

1,053,632.

Patented Feb. 18, 1913.

2 SHEETS—SHEET 1.

WITNESSES.

INVENTOR.

V. MULHOLLAND.
APPARATUS FOR HANDLING GLASSWARE.
APPLICATION FILED JULY 22, 1908.
1,053,632.
Patented Feb. 18, 1913.
2 SHEETS—SHEET 2.
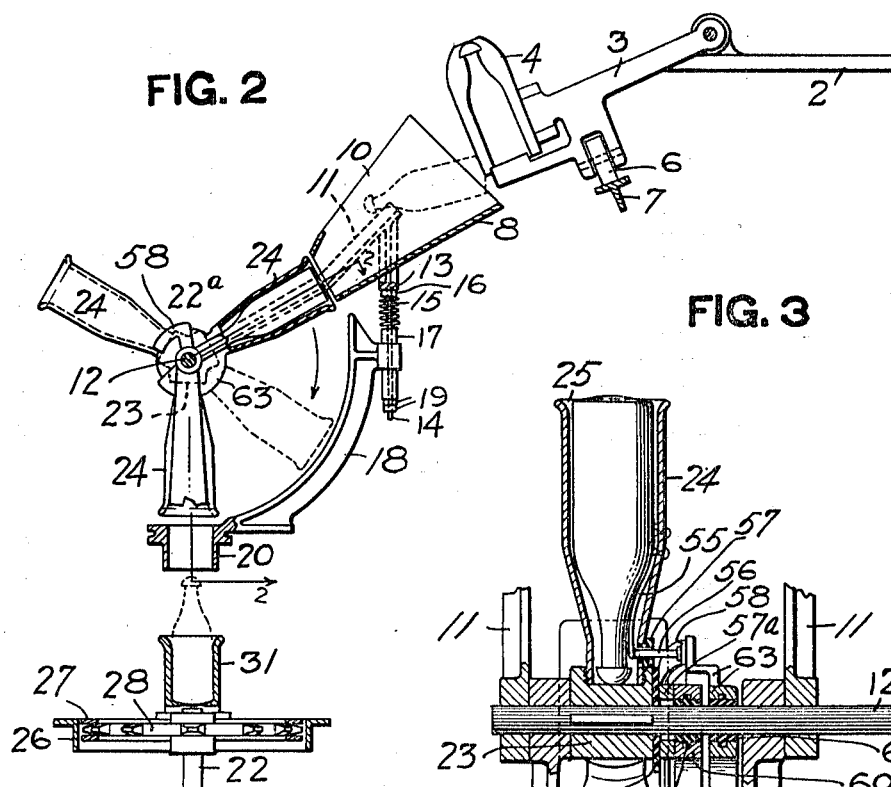
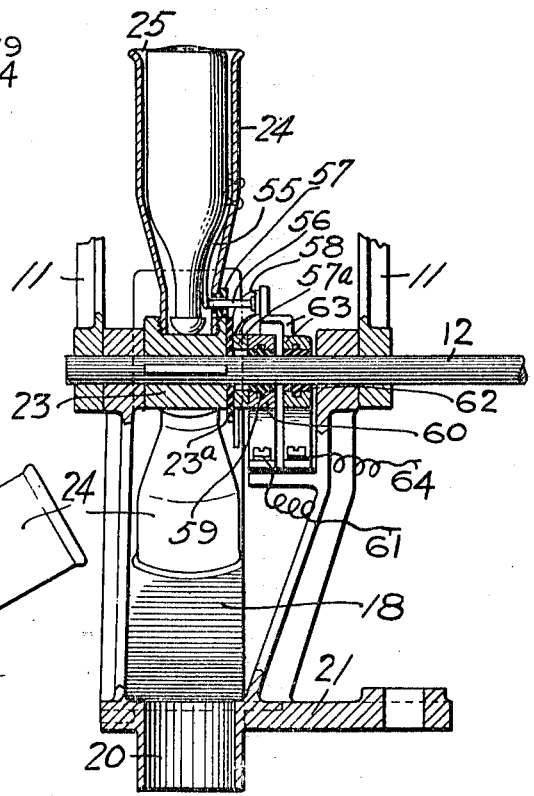
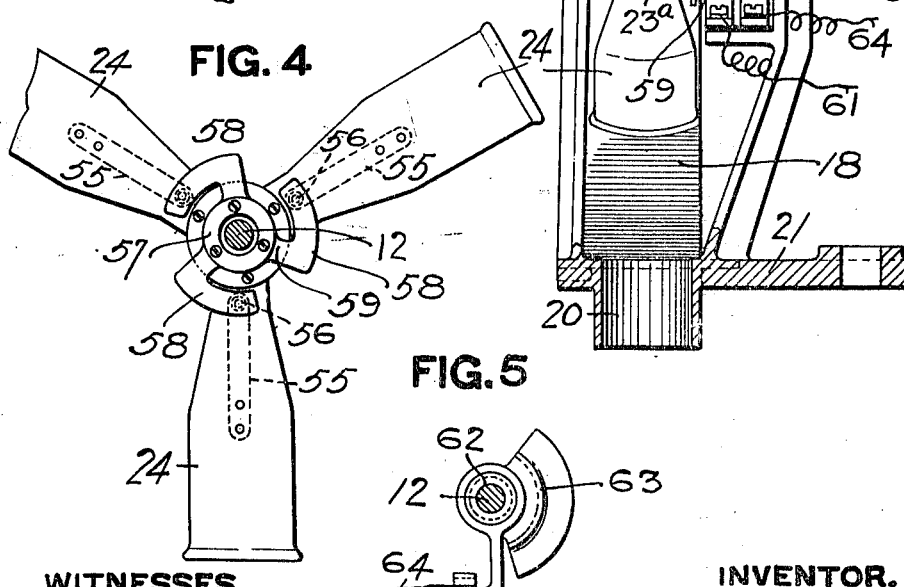
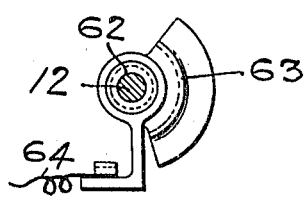
WITNESSES.
INVENTOR.

UNITED STATES PATENT OFFICE.

VERGIL MULHOLLAND, OF EDGEWOOD, PENNSYLVANIA, ASSIGNOR TO HEYL & PATTERSON, INCORPORATED, A CORPORATION OF PENNSYLVANIA.

APPARATUS FOR HANDLING GLASSWARE.

1,053,632.  Specification of Letters Patent.  Patented Feb. 18, 1913.

Application filed July 22, 1908. Serial No. 444,768.

*To all whom it may concern:*

Be it known that I, VERGIL MULHOLLAND, a resident of Edgewood, in the county of Allegheny and State of Pennsylvania, have invented a new and useful Improvement in Apparatus for Handling Glassware; and I do hereby declare the following to be a full, clear, and exact description thereof.

My invention relates to apparatus for handling glassware, the object of the invention being to provide for the handling of glassware as it comes from the mold and delivering it to a conveyer without manual labor.

To these ends my invention comprises the novel features hereinafter set forth and claimed.

Figure 1:
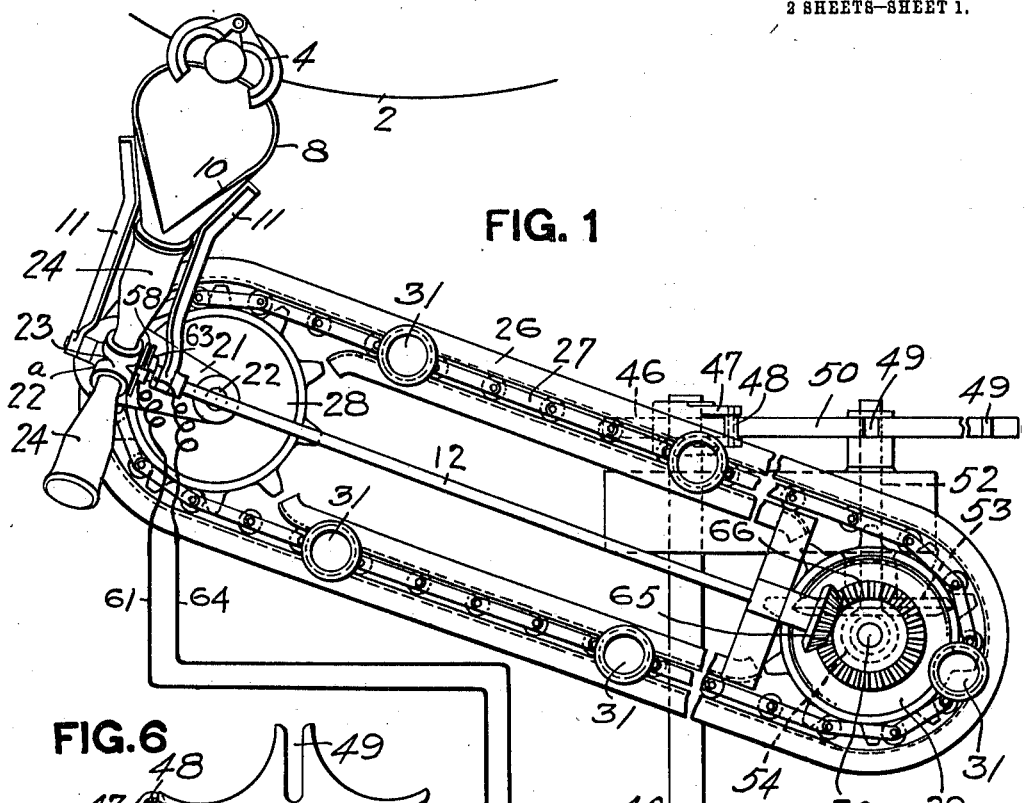
Figure 6:
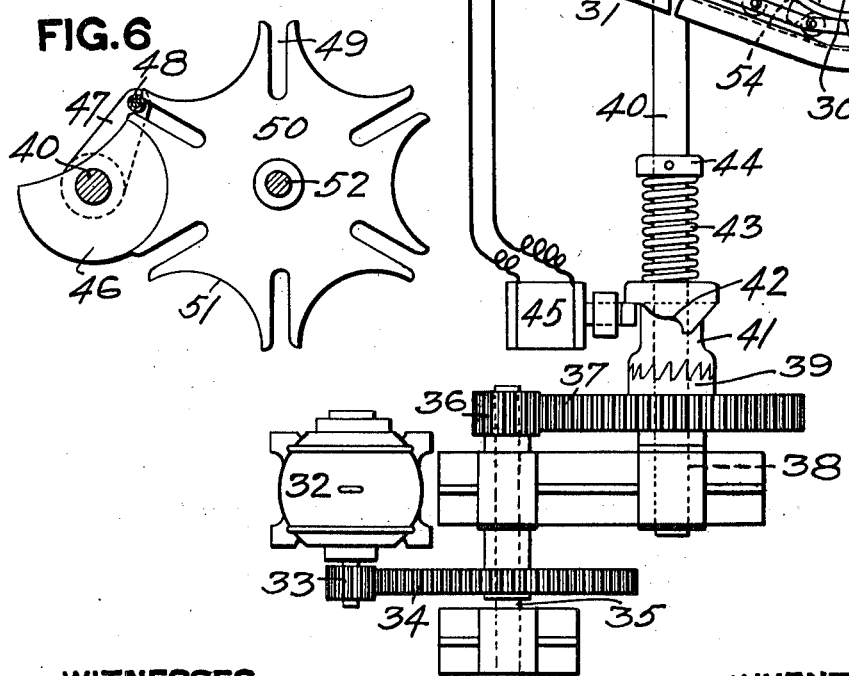

Referring to the drawings Figure 1 is a plan view of my improved apparatus; Fig. 2 is a side view partly in section of the device for receiving the ware from the mold and delivering it to the conveyer; Fig. 3 is an enlarged section on the line 2—2, Fig. 2; and Figs. 4, 5 and 6 are details.

I have illustrated my invention as used in connection with a molding apparatus in which the ware is discharged by gravity from the mold, the mold opening automatically as the revolving table carrying the same comes around into proper position. I have not deemed it necessary, however, to illustrate such molding apparatus in detail but have simply shown the same in diagrammatic form, as my invention in no way pertains to such molding apparatus. Accordingly the numeral 2 designates the rotary table of such molding apparatus and hinged to said table is the arm 3 which carries the partible mold 4, said mold in this instance being of a form suitable for molding a bottle. The arm 3 has the roller 6 which is adapted to travel on the track 7, said track being arranged in such a way as to provide for the tilting of the mold in the manner indicated in Fig. 2, while at the same time the mold is opened automatically to allow the bottle to be discharged therefrom.

At the point where the mold 4 opens to discharge the bottle is located the chute or hopper 8 which has the flaring mouth portion and cut away, as at 10, to permit of the bottle dropping from the mold into the chute without injury to the same. This hopper or chute 8 is supported by the arm 11 secured to the opposite ends of the shaft 12. The arms 11 have the yoke 13. A bolt 14 engages the yoke 13 and the spring 15 encircles the bolt 14, said spring being interposed between the lock nut 16 and the sleeve 17 of the frame 18. At the outer end of the bolt 15 are the nuts 19 by means of which the adjustment of the chute 8 is obtained. The frame 18 has at its lower end the collar 20 which acts as a guide for the bottle and said frame is further provided with the plate 21 which is secured to the vertical shaft 22. The transfer device 22ª comprises the central or hub portion 23 which is mounted on the shaft 12 so as to rotate thereon, and secured to said hub portion are the holders 24 screwed into the threaded seats in the hub portion 23. These holders 24 may be of any suitable shape according to the article of glassware which is being handled and as in the present case I have illustrated my invention in connection with the handling of bottles said holders conform substantially to the shape of the bottle to be handled. The holders have the open ends 25 for the admission and discharge of the bottles as fully hereinafter set forth.

I have illustrated my invention in connection with a conveyer 26 which consists of an endless chain 27 passing around the sprocket wheels 28 and 29. The sprocket wheel 28 is mounted on the shaft 22 and the sprocket wheel 29 on the shaft 30. Secured to the endless chain 27 at suitable intervals are the cups 31 which are adapted to receive the ware from the holders 24 and the movement of the chain 27 is timed to operate in conjunction with the revolving holders 24, so that a cup will be brought around in position to receive the bottle as it is discharged from one of the holders, all as fully hereinafter set forth. To effect this result requires an intermittent motion of the chain 27 as well as of the revolving holder 22 and I will now proceed to describe such mechanism. An electric motor 32 has the pinion 33 on its shaft which meshes with the gear wheel 34 on the shaft 35. A pinion 36 on the shaft 35 meshes with the gear wheel 37 on the shaft 38. This shaft 38 is provided with the clutch 39. In line with the shaft 38 is the shaft 40 which has the clutch 41 slidable thereon. This clutch 41 has the cam 42. A spring 43 is interposed between the clutch 41 and a collar 44 on the shaft 40, said spring acting normally to throw the clutch 41 into engagement with the clutch 39. To provide for controlling the movement of the clutch 41 I employ a solenoid 45 and in order to operate said solenoid it is connected up to the rotary holder 22 in the manner hereinafter set forth. At the opposite end of the shaft 40 is the disk 46, said disk having the arms 47 which carry the idle roller 48. This roller 48 is adapted to engage the pockets 49 on the wheel 50, said wheel being cut away, as at 51, to provide for the rotation of the disk 46 in conjunction with said wheel and by the engagement of the roller 48 with the pockets 49 an intermittent movement is imparted to the wheel 50. A shaft 52 upon which the wheel 50 is mounted has the beveled pinion 53 which engages with a like pinion 54 on the vertical shaft 30 carrying the sprocket wheel 29. It is apparent from the above that by the rotation of the shaft 40 an intermittent movement will be imparted to the conveyer 27.

I desire to operate the solenoid 45 automatically by the admission of the bottle into the holder 24 and for this purpose each holder is provided with the spring arm 55 which is adapted to be moved outwardly by the weight of the bottle coming in contact therewith. The free end of the spring arm 55 is adapted to bear against the pin 56 which is adapted to move in the bushing 57 of insulating material. A disk 57ª is secured to the hub portion 23 of the rotary holder and the insulating material 23ª is interposed between said disk and said hub. This disk 57ª carries the contact pieces 58 at suitable intervals apart and said contact pieces are mounted on the spring arms 59 secured to said disk 57ª. A ring 59 of insulating material is secured to the shaft 12 and secured to said ring is the metal ring 60 which is in frictional contact with the disk 57ª. A wire 61 connects the ring 60 to the solenoid 45. An insulating ring 62 is mounted on the shaft 12 and to this insulating material is secured the metal ring 63. A wire 64 connects the metal ring with the solenoid 45. It will be apparent from the above that when the bottle enters the holder 24 and presses the lower end of the spring arm 55 outwardly the pin 56 will be forced outwardly and will force one of the contacts 58 into engagement with the rim of the ring 63, thereby completing the circuit to the solenoid. In order to impart an intermittent movement to the shaft 12 the said shaft has the beveled pinion 65 which meshes with the beveled pinion 66 on the shaft 30.

The ware, as it is finished in the mold, is deposited by the tilting of the mold into the chute 8 bottom end up as indicated. The bottle passes into the holder 24 in position to receive it and said bottle acts to move the spring arm 55 outward. This acts to force the pin 56 outwardly and brings the contact piece 58 on the disk 57ª into contact with the rim of the disk 63. In this manner the circuit is completed to the solenoid and the solenoid is withdrawn, permitting the clutch 41 to move into engagement with the clutch 39. Power is thus transmitted to the shaft 40 and through said shaft and the intermediate connections to the vertical shaft 30. The conveyer 27 is accordingly moved to bring one of the cups 31 around in proper position to receive the bottle from the holder 24, while at the same time through the connections described a rotary movement is imparted to the shaft 30 and through it to the shaft 12 carrying the rotary holder 22. The movement of the rotary holder and the conveyer 27 is so timed as to bring one of the cups 31 around in position to receive the bottle from the holder 24. After the bottle passes through an arc of 45° from the time of leaving its receiving position with reference to the chute 8 the bottle will tend to drop from the holder 24 and said bottle is held from falling by the curved face of the frame 18. However, said bottle falls sufficiently to release the spring arm 55 before the bottle reaches the point where it is to be discharged through the guide 20 into the cup 31. The arm 55 being released the pin 56 recedes and the contacts 58 are freed from the disk 63 and the circuit to the solenoid broken. This permits the solenoid to advance and engage the cam of the clutch 41 so that by the time the bottle holder has reached a point directly over the guide 20 the cam 42 will have moved the shaft 40 so as to throw the clutch 41 out of engagement with the clutch 39 and the rotation of the rotary holder, as well as the conveyers 27, ceases.

As stated above, the conveyer 27 is timed to stop just as soon as the bottle holder arrives at the point where the bottle is discharged through the guide 20, whereupon it passes into the cup 31. In the meantime another holder 24 has been brought around into position to receive a bottle from the chute 8 and this bottle upon being received by the holder 24 completes the circuit to the solenoid in the same manner and the rotary movement is imparted to the rotary holder 22, while at the same time the conveyer 27 is moved in the same manner as before. In this way the bottles will be fed continuously to the chute and delivered to the cups 31 upon the conveyer to be carried by said conveyer to a point where the bottles may be lifted and conveyed into the leer, all as clearly set forth and described in an application filed by me June 24, 1908, Serial No. 440,203.

The chute 8 is capable of adjustment in case in the operation of the device the holder should fail to coincide accurately with the chute by means of the adjusting bolt 14.

It is apparent that there are various ways in which the electric circuit may be completed to the solenoid and I do not wish to limit myself in any way to the construction illustrated and described.

What I claim is:

1. In apparatus for handling glassware, the combination of a rotary holder comprising a body portion and a plurality of receptacles extending out therefrom, a conveyer adjacent thereto, and means for moving said rotary holder to discharge the article open end up on said conveyer.

2. In apparatus for handling glassware, the combination of a rotary holder comprising a body portion and a plurality of receptacles extending out therefrom, a conveyer adjacent thereto, and means for imparting an intermittent movement to said rotary holder to deposit the ware upon said conveyer.

3. In apparatus for handling glassware, the combination of a rotary holder comprising a body portion and a plurality of receptacles extending out therefrom adapted to receive the article inverted, a conveyer adjacent thereto, and means for rotating said holder to deposit said articles open end up on said conveyer.

4. In apparatus for handling glassware, the combination of a rotary holder, a conveyer adjacent thereto, mechanism for rotating said holder to deposit the ware on said conveyer, and positive mechanical means for operating said mechanism put into operation by the entrance into said holder of said article.

5. In apparatus for handling glassware, the combination of a rotary holder, a conveyer adjacent thereto, and mechanism for imparting an intermittent rotary movement to said holder, and positive mechanical means for operating said mechanism put into operation by the entrance into said holder of said article.

6. In apparatus for handling glassware, the combination of a rotary holder, a conveyer adjacent thereto, mechanism for imparting an intermittent movement to said holder and to said conveyer, and means operated by the entrance of the bottle to said holder for putting said intermittent mechanism in operation.

7. In apparatus for handling glassware, the combination of a rotary holder, a conveyer adjacent thereto adapted to receive the article from said holder, mechanism for imparting an intermittent movement to said holder, and means operated electrically by the entrance of said article into said holder for operating said intermittent mechanism.

8. In apparatus for handling glassware, the combination of a rotary holder, a conveyer adjacent thereto adapted to receive the article discharged therefrom, mechanism for imparting rotary movement to said holder, means for operating said mechanism electrically, and means operated by the entrance of the article into said holder to form an electric circuit to operate said mechanism for imparting an intermittent movement to said holder.

9. In apparatus for handling glassware, the combination of a rotary holder, a conveyer in position to receive the article discharged therefrom, mechanism for imparting intermittent rotary movement to said holder, an arm in said holder, means for completing an electric circuit by the movement of said arm, and means operated by said electric circuit for imparting said intermittent mechanism.

10. In apparatus for handling glassware, the combination of a rotary holder, a conveyer adjacent to said holder to receive the article discharged therefrom, mechanism for imparting intermittent movement to said holder, a solenoid, mechanism controlled by said solenoid for operating said intermittent mechanism, and means for closing the circuit to said solenoid by the entrance of said article into said holder.

11. In apparatus for handling glassware, the combination of a rotary holder, a conveyer adjacent thereto adapted to receive the article discharged therefrom, a power driven shaft, a second shaft, means for throwing said second shaft into engagement with said power shaft, connections between said second shaft, and mechanism for imparting intermittent movement to said rotary holder, a solenoid controlling the engagement of said second shaft with said power shaft, and means operated by the entrance of the article of glassware to said holder to complete the circuit to said solenoid.

12. In apparatus for handling glassware, the combination of a rotary holder, a conveyer adjacent thereto adapted to receive the article discharged therefrom, a power shaft, a second shaft in alinement therewith, clutch devices carried by said shafts, connections between said second shaft and mechanism for imparting intermittent movement to said conveyer, a cam on said second shaft, a solenoid adapted to engage said cam, and means operated by the entrance of said article to said holder to complete the circuit to said solenoid.

13. In apparatus for handling glassware, the combination of a hopper, a rotary frame, a plurality of holders on said frame, a conveyer adjacent thereto, and means for rotating said frame to bring one of said holders in line with said hopper, and another in position to deposit the ware on said conveyer simultaneously.

14. In apparatus for handling glassware, the combination of a hopper, a rotary frame, a plurality of open ended holders on said frame, a conveyer adjacent thereto, and means for rotating said frame to bring one of said holders in line with said hopper, and one in position to discharge the ware on said conveyer simultaneously.

15. In apparatus for handling glassware, the combination of a hopper, an open ended rotary holder, having a common inlet and discharge mechanism for moving said holder in the arc of a circle, a conveyer adjacent thereto, means for retaining the article within said holder as said holder passes beyond the center, and means for directing the ware onto said conveyer.

16. In apparatus for handling glassware, the combination of a hopper, an open ended rotary holder, mechanism for moving said holder in the arc of a circle, a conveyer adjacent thereto, a curved guide in the sweep of said holder for retaining the article within said holder, and means for directing the ware into said conveyer.

In testimony whereof, I the said VERGIL MULHOLLAND have hereunto set my hand.

VERGIL MULHOLLAND.

Witnesses:
ROBERT C. TOTTEN,
J. R. KELLER.